US012576554B2

(12) United States Patent
Jackson, II et al.

(10) Patent No.: US 12,576,554 B2
(45) Date of Patent: Mar. 17, 2026

(54) METHODS AND APPARATUSES FOR CUTTING

(71) Applicant: Westlake Royal Roofing LLC, Houston, TX (US)

(72) Inventors: William E. Jackson, II, Portland, OR (US); Jacob Myers, Corona, CA (US); Russell L. Hill, San Antonio, TX (US); Amitabha Kumar, San Antonio, TX (US); Russ K. Majors, San Marcos, TX (US); Daniel Genord, South Lyon, MI (US); Grey Parker, West Bloomfield, MI (US)

(73) Assignee: Westlake Royal Roofing LLC, Houston, TX (US)

( * ) Notice: Subject to any disclaimer, the term of this patent is extended or adjusted under 35 U.S.C. 154(b) by 11 days.

(21) Appl. No.: 18/743,698

(22) Filed: Jun. 14, 2024

(65) Prior Publication Data

US 2024/0408794 A1 Dec. 12, 2024

Related U.S. Application Data

(63) Continuation of application No. 17/160,668, filed on Jan. 28, 2021, now Pat. No. 12,030,215.

(60) Provisional application No. 62/968,334, filed on Jan. 31, 2020.

(51) Int. Cl.
*B28D 1/22* (2006.01)
*B28D 7/04* (2006.01)

(52) U.S. Cl.
CPC .............. *B28D 1/225* (2013.01); *B28D 7/04* (2013.01)

(58) Field of Classification Search
CPC .......... B28D 1/22; B28D 1/222; B28D 1/223; B28D 1/225; B28D 1/226; B28D 1/228; B28D 1/327; E04F 21/0076
See application file for complete search history.

(56) References Cited

U.S. PATENT DOCUMENTS

| | | | |
|---|---|---|---|
| 2,188,318 | A | 1/1940 | Siderits |
| 2,712,169 | A | 7/1955 | Buttress |
| 2,762,359 | A | 9/1956 | Entz |
| 2,808,822 | A | 10/1957 | Celapino et al. |
| 2,867,205 | A | 1/1959 | Vesper |
| 2,912,970 | A | 11/1959 | Schlough et al. |
| 3,095,868 | A | 7/1963 | Mangis |
| 3,439,664 | A | 4/1969 | Sylvester |

(Continued)

OTHER PUBLICATIONS

Bon 11-500 Splitter Table for 11-590 Paver and Brick Buster, available at https://www.amazon.com/SKEMiDEX-Guillotine-Concrete-Splitter-packaging/dp/B077XHPVV1/ref=pd_sbs_469_3/134-6815573-0548933?_encoding=UTF8&pd_rd_i=B077XHPVV1&pd_rd_r=9bc6b587-e8b9-4732-9d7a-a636b2126df7&pd_rd_w=VsE4J&pd_rd_wg=KR2hO&pf_rd_p=d66372fe-68a6-48a3-90ec-41d7f64212be&pf_rd_r=J1Z2VT8ZT0W0MR7D7GMD&psc=1&refRID=J1Z2VT8ZT0W0MR7D7GMD (last accessed Jan. 31, 2020).

(Continued)

*Primary Examiner* — Joel D Crandall
(74) *Attorney, Agent, or Firm* — Bookoff McAndrews, PLLC

(57) ABSTRACT

Cutting apparatuses and methods of use thereof are discussed. For example, the cutting apparatus may include a chassis with one or more substrate interfaces and a scribe guide. The cutting apparatuses also may include a plurality of support pistons, a deformable support, a locking mecha-
(Continued)

nism, and/or an anchor extension. The support pistons may be adjustable to generally conform to a substrate, such as a non-planar substrate.

19 Claims, 8 Drawing Sheets

(56) References Cited

U.S. PATENT DOCUMENTS

| | | | | | |
|---|---|---|---|---|---|
| 3,559,631 | A | | 2/1971 | Mangis | |
| 3,677,258 | A | | 7/1972 | Fletcher et al. | |
| 4,192,282 | A | * | 3/1980 | Fischer | B28D 1/225 125/23.02 |
| 4,203,414 | A | * | 5/1980 | McClain | B28D 7/00 125/23.01 |
| 4,329,865 | A | | 5/1982 | Meinholdt | |
| 4,577,613 | A | | 3/1986 | Porsfeld | |
| 5,480,081 | A | * | 1/1996 | Wilson | B28D 1/225 83/886 |
| 5,617,642 | A | | 4/1997 | Marios | |
| 5,662,094 | A | | 9/1997 | Giacomelli | |
| 6,102,026 | A | | 8/2000 | Fladgard et al. | |
| 6,568,577 | B2 | | 5/2003 | Baird et al. | |
| 6,886,551 | B2 | | 5/2005 | Scherer et al. | |
| 7,107,982 | B1 | * | 9/2006 | Lechner | B28D 1/223 125/35 |
| D536,945 | S | | 2/2007 | Yang | |
| D541,127 | S | | 4/2007 | Yang | |
| 7,428,900 | B2 | | 9/2008 | Scherer | |
| D608,375 | S | | 1/2010 | Kokawa et al. | |
| 7,685,730 | B2 | * | 3/2010 | Dozier | E04F 21/0076 33/527 |
| 9,399,310 | B2 | * | 7/2016 | Cetrangolo | B28D 1/222 |
| 2005/0016518 | A1 | * | 1/2005 | Ishii | B28D 1/225 125/23.02 |
| 2005/0283986 | A1 | | 12/2005 | Nicholson | |
| 2008/0010941 | A1 | * | 1/2008 | Thomsen | E01C 5/003 52/747.12 |
| 2011/0174130 | A1 | * | 7/2011 | Zhang | B26D 7/04 83/602 |

OTHER PUBLICATIONS

COLIBROX—Cut 3.5" Guillotine Concrete Block Brick Paver Splitter Cutter, available at https://www.amazon.com/SKEMiDEX-Guillotine-Concrete-Splitter-packaging/dp/B077XHPVV1/ref=pd_sbs_469_3/134-6815573-0548933?_encoding=UTF8&pd_rd_i=B077XHPVV1&pd_rd_r=9bc6b587-e8b9-4732-9d7a-a636b2126df7&pd_rd_w=VsE4J&pd_rd_wg=KR2hO&pf_rd_p=d66372fe-68a6-48a3-90ec-41d7f64212be&pf_rd_r=J1Z2VT8ZT0W0MR7D7GMD&psc=1&refRID=J1Z2VT8ZT0W0MR7D7GMD (last accessed Jan. 31, 2020).

Hytile Tilecutter, available at https://urldefense.proofpoint.com/v2/url?u=http-3A_www.hytile.com.au_our-2Dproducts_tilecutters&d=DwMFAg&c=AuKVczNxVRoefSOfd4W5fg&r=tvfUhbA_wfu-GC5ts7gqgBlmehH8YHI5pFgLyP4NQwk&m=eEqv3A662TOUs8sCa272h0xJ1CzeUwW2_mneu0pucPc&s=FqLdt_rz1e1ul8SWtKmbUb4L4Z5tRoRjmlJpA-enscE&e= (last accessed Jan. 31, 2020).

Design U.S. Appl. No. 29/722,711, filed Jan. 31, 2020 (9 pages).

* cited by examiner

METHODS AND APPARATUSES FOR CUTTING

CROSS-REFERENCE TO RELATED APPLICATIONS

This application is a continuation of U.S. application Ser. No. 17/160,668, filed on Jan. 28, 2021, which claims the benefit of priority to U.S. Provisional Application No. 62/968,334, filed on Jan. 31, 2020, each of which is incorporated by reference herein in its entirety.

TECHNICAL FIELD

The present disclosure generally relates to apparatuses for cutting and methods, e.g., methods of using an apparatus to cut a substrate.

BACKGROUND

Substrates such as tiles, stones, ceramics, or concrete may be useful for many different applications due to their unique physical-chemical properties and durability. Some substrates are manufactured as repeating structures, similar to flat, square tiles, but with varying three-dimensional profiles, shapes, and/or designs. Methods and apparatuses of cutting flat substrates often are not compatible with substrates that have other, e.g., non-planar, three-dimensional profiles and shapes. Apparatuses and methods of cutting substrates that do not account for three-dimensional profiles and shapes of substrates can result in unpredictable cuts, unprecise cuts, and/or damage to the cut pieces.

SUMMARY

The present disclosure includes composite apparatus and methods for cutting a substrate. For example, the present disclosure includes an apparatus comprising a chassis including a substrate interface and a scribe guide. The scribe guide may extend along a width of the apparatus and define a slot proximate the substrate interface. The apparatus may further comprise a scribe insertable within, and slidable along, the slot. The substrate interface may be configured to retain and/or support a non-planar substrate. According to some aspects of the present disclosure, the substrate interface may include a top substrate interface and a bottom substrate interface opposite the top substrate interface. The apparatus may include a locking mechanism that fixes a position of the substrate interface relative to the chassis and/or that fixes a position of the top substrate interface relative to the bottom substrate interface.

The scribe guide may be coupled to a substrate interface, for example, the top substrate interface. In some examples, apparatus may include a scribe insertable within, and slidable along, the slot. According to some aspects of the present disclosure, the apparatus may further comprise a plurality of support pistons extending in a direction transverse to the substrate interface, wherein the plurality of support pistons is aligned with the slot and at least one support piston of the plurality of support pistons is moveable relative to the substrate interface. The plurality of support piston(s) may be movable via springs, a cam mechanism, one or more levers, a compressed fluid, or a combination thereof. For example, the plurality of support pistons may be movable between a first position and a second position, such as a second pre-determined position. In some examples, the cutting apparatus further comprises a plurality of legs and an anchor extension coupled to, and movable relative to, one or more of the plurality of legs.

According to some examples herein, an apparatus may comprise a chassis, including a top substrate interface and a bottom substrate interface opposite the top substrate interface, and a scribe guide. The scribe guide may be coupled to the top substrate interface or the bottom substrate interface. The scribe guide may define a slot extending along a width of the top substrate interface or bottom substrate interface. The top substrate interface, the bottom substrate interface, or both, are configured to support a non-planar substrate.

The apparatus may further comprise a plurality of support pistons aligned with the slot, wherein each support piston of the plurality of support pistons is moveable relative to the chassis. In some aspects described herein, the plurality of support pistons are movable via springs, a cam mechanism, one or more levers, a compressed fluid, or a combination thereof. The plurality of support pistons may include at least two, e.g., at least three, four, or five or more support pistons arranged in a row at regular intervals.

In some examples of the present disclosure, the apparatus may include a deformable support between at least a portion of the top substrate interface and at least a portion of the bottom substrate interface. In at least one example, the deformable support may comprise a fluid or particles within a cover. The apparatus may further include a locking mechanism that fixes a position of the top substrate interface relative to the bottom substrate interface.

Also disclosed herein are methods for cutting a substrate. For example, the method may comprise placing the substrate between two substrate interfaces of a cutting apparatus, making a score line on the substrate, and separating the substrate into at least two pieces. For example, the substrate may be separated into two pieces defined by the score line. The substrate may be non-planar and/or may comprise concrete. According to some aspects of the present disclosure, the cutting apparatus comprises a plurality of support pistons, and the method further comprises changing the height of one support piston relative to the height of an adjacent support piston before making the score line such that each support piston of the plurality of support pistons contacts the substrate. After adjusting the height of one or more support pistons, a top of each support piston may be in contact with the substrate. Methods may further include engaging a locking mechanism prior to making the score line. In some aspects, making the score line may include moving a scribe within a slot of the cutting apparatus.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1A:
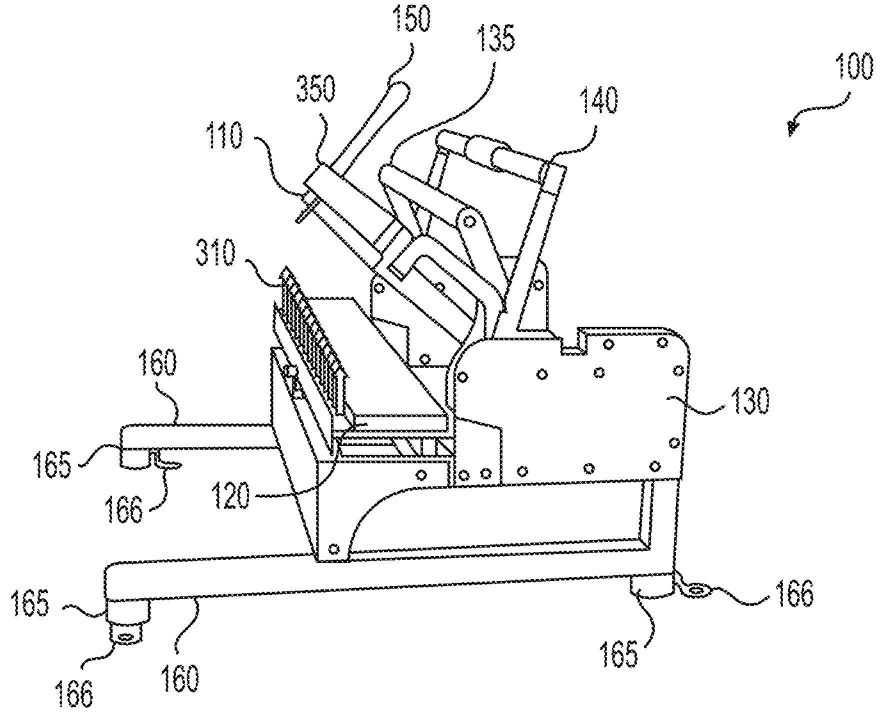
FIGS. 1A and 1B are perspective views of an exemplary cutting apparatus in an open and closed configuration, respectively, in accordance with the present disclosure.

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., a distance between 1.5 centimeters (cm) and 3.5 cm includes distances of 1.5 cm, 3.5 cm, and all values between.

The present disclosure includes apparatuses for cutting, for example, apparatuses for cutting a substrate (e.g., tile, ceramic, stone, concrete, or other substrate) and methods, such as, for example, methods of using an apparatus to cut a substrate. Apparatuses for cutting may include, for example, a top substrate interface, a bottom substrate interface, a scribe guide, a contouring substrate support, a compressive substrate support, an inflatable substrate support, and/or one or more locking mechanisms. Apparatuses and methods described herein may allow for a substrate to be cut into multiple pieces, where each piece maintains its integrity.

Some materials, such as for example, tile, ceramic, stone, concrete, or other rigid substrate materials (e.g., non-homogenous and/or non-planar substrates), may resist cutting or breaking in an organized and/or predictable manner. For example, pieces of such substrates, when cut, may fracture, crack, break, or otherwise lose structural integrity. Attempts to cut a substrate into multiple pieces may result in the substrate not separating into pieces as intended and/or at least one of the resulting pieces fracturing, crumbling, breaking, cracking, or otherwise becoming unusable.

According to one or more embodiments of the present disclosure, an apparatus for cutting may be configured to allow a rigid substrate (e.g., a substrate comprising tile, ceramic, and/or stone) to be scored and/or separated into multiple pieces (e.g., cut into multiple pieces), while maintaining the structural integrity of each component piece. The substrate may be non-planar, e.g., having a curved profile with one or more concave and/or convex surfaces, such as a barrel tile. Thus, for example, one or more surfaces of the substrate along which a cut is desired (e.g., the surface(s) of the substrate that a scribe may contact to make a score line) may be non-planar, such as having a wavy or S-shaped profile. Optionally, the substrate may include one or more features for interfacing with an adjacent substrate. For example, one or more edges of the substrate may include a feature that interconnects with a corresponding feature on one or more edges of another substrate. The features for interfacing with adjacent substrates may have a different thickness than the rest of the substrate. For example, edges that include a feature for interfacing may have a smaller thickness than another region of the substrate.

A cutting apparatus may include one or more interfaces configured to hold (e.g., secure, anchor, fix-in-place, etc.) a substrate in place relative to the cutting apparatus. For example, a cutting apparatus may include a top substrate interface and/or a bottom substrate interface. As used herein, the words "top" and "bottom" may be used descriptively to distinguish different components of one or more cutting apparatus embodiments, and are not meant to necessarily denote a preferred orientation of components. Those skilled in the art will understand that other configurations (e.g., where a top substrate interface is positioned below a bottom substrate interface) are also considered and encompassed herein. Various other components, e.g., scribe guide, a scoring region, a contouring substrate support, a compressive support, and/or one or more locking mechanisms, may be incorporated into one or more cutting apparatus embodiments described herein to assist, for example, with cutting a substrate.

Figure 1B:
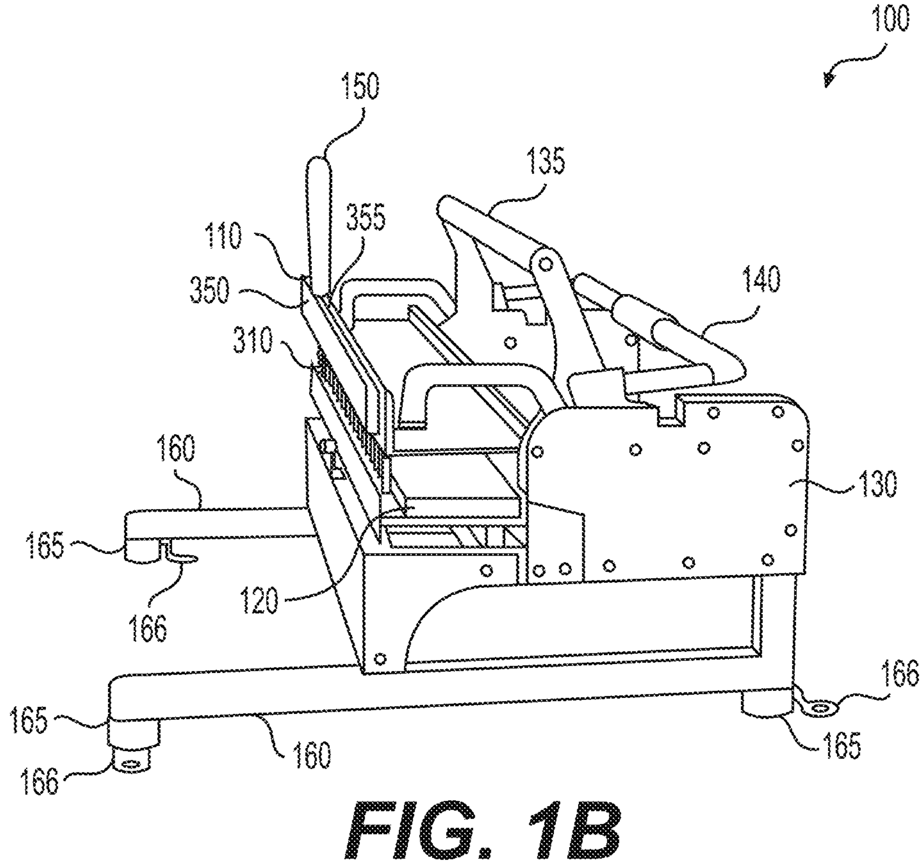

Referring to FIGS. 1A-1B, an exemplary cutting apparatus 100 may include a top substrate interface 110 and a bottom substrate interface 120. The cutting apparatus 100 may be operable to move between different configurations, such as, for example, an open configuration (e.g., FIG. 1A) and a closed configuration (e.g., FIG. 1B). When in an open configuration, cutting apparatus 100 may be configured to receive a substrate (e.g., tile, ceramic, stone, concrete, etc.). For example, cutting apparatus 100, in an open configuration, may have a distance between top substrate interface 110 and bottom substrate interface 120 greater than the distance between top substrate interface 110 and bottom substrate interface 120 of cutting apparatus 100 in a closed configuration.

Any suitable dimensions of the various components of cutting apparatus 100, 200 may be employed, e.g., depending on the size and shape of substrate being cut. By way of example and not a limitation, in an open configuration, top substrate interface 110 and bottom substrate interface 120 may be separated by a distance of 5 inches (in) to 30 in, e.g., 10 in to 30 in, 10 in to 25 in, 10 in to 20 in, 15 in to 30 in, 15 in to 25 in, 10 in to 18 in, 5 in to 25 in, 5 in to 20 in, or 15 in to 20 in. In a closed configuration, top substrate interface 110 and bottom substrate interface 120 may be separated by a distance of 0.5 in to 15 in, e.g., 1 in to 15 in, 1 in to 10 in, 0.5 in to 10 in, 2 in to 15 in, 2 in to 10 in, 3 in to 15 in, 3 in to 10 in, 0.5 in to 5 in, or 1 in to 5 in.

After cutting apparatus 100 receives the substrate, cutting apparatus 100 may be moved or converted into a closed configuration via, for example, manual manipulation, a lever, pneumatic pressure, or other mechanism. As is described in greater detail below, cutting apparatus 100 may include a locking mechanism that, when engaged, prevents cutting apparatus 100 from moving from a closed configuration to an open configuration or vice versa. After a substrate has been cut (e.g., into multiple pieces), the locking mechanism may be disengaged. For example, after the locking mechanism is disengaged, cutting apparatus 100 may be moved from a closed configuration to an open configuration to allow one or more pieces of the substrate to be retrieved from cutting apparatus 100.

As described above, one or more substrate interfaces (e.g., top substrate interface 110 and/or bottom substrate interface 120) may hold a substrate in place, relative to cutting apparatus 100, while the substrate is cut, e.g., wherein one or more other components of cutting apparatus 100 may assist in cutting of the substrate. For example, referring to FIGS. 1A-1B, cutting apparatus 100 may include a scribe guide 350 (e.g., including a slot 355), one or more support pistons 310 (e.g., a plurality of support pistons 310), and/or a scribe 150. Scribe guide 350 may be compatible with scribe 150, e.g., a scribe 150 having a scoring tip on one end and a handle on the other end. For example, the dimensions of slot 355 may be such that scribe 150 may be inserted such that the scoring tip extends past top substrate interface 110. In some embodiments, cutting apparatus may include a scribe 150 affixed to scribe guide 350 but moveable, e.g., slidable, within slot 355 along a width of scribe guide 350 and/or along a height of scribe guide 350. According to some aspects of the present disclosure, scribe 150 may be a separate component, such that scribe 150 may be removed and replaced with a different scribe or other cutting tool (having dimensions so as to fit within slot 355).

In some embodiments, after cutting apparatus 100 is moved to a closed configuration, neither top substrate interface 110 nor bottom substrate interface 120 contact that substrate 500. For example, substrate 500 may be retained between, and in contact with, one or more support pistons 310 and scribe guide 350.

Still referring to FIGS. 1A-1B, cutting apparatus 100 may include a plurality of support pistons 310. Each support piston 310 may have a height and may move relative to bottom substrate interface 120, e.g., from a position at or below bottom substrate interface 120 to a position at, below, or above, bottom substrate interface 120. The plurality of support pistons 310 may be components of a contouring substrate support system. In at least one example as described herein, each of the support pistons 310 may individually and selectively be raised and/or lowered to a height. The plurality of support pistons 310, at various heights, may support one or more surfaces of a substrate (e.g., angled, curved, raised, inclined, tapered, and/or sloped surfaces) in contact with top substrate interface 110 and/or bottom substrate interface 120. As a substrate is in contact with (e.g., being secured by) top substrate interface 110, bottom substrate interface 120, and/or one or more support pistons 310, a scribe 150 may be passed transversely across a surface of the substrate (e.g., as scribe 150 slides along slot 355 of scribe guide 350). For example, a scribe 150 may be passed across a surface of the substrate such that the scoring tip of the scribe 150 creates a score line on the substrate.

Cutting apparatus 100 may include a lever 140. Lever 140 may be configured such that, when activated (e.g., manually manipulated from a first position to a second position), lever 140 may engage one or more locking mechanisms. As described herein, one or more locking mechanisms, when engaged, may hold (secure, fix, etc.) top substrate interface 110, scribe guide 350, bottom substrate interface 120, and/or one or more support pistons 310, relative to the substrate.

Cutting apparatus 100 may include a chassis 130. The chassis 130 may support, house, include, contain, and/or connect various components of cutting apparatus 100 to each other. For example, chassis 130 may be connected to top substrate interface 110, bottom substrate interface 120, a contouring substrate support (e.g., including a plurality of support pistons 310), lever 140, and one or more legs 160 of cutting apparatus. Chassis 130 may include a handle 135 that is not connected to one or more moving parts of cutting apparatus 100 (e.g., top substrate support 110, contouring substrate support, lever 140). Handle 135 may allow cutting apparatus 100 to be maneuvered, positioned, located, and/or moved without affecting functionality, positioning, and/or operation of one or more other components of cutting apparatus 100.

Still referring to FIGS. 1A-1B, cutting apparatus 100 may include one or more legs 160. Legs 160 may form a base of cutting apparatus 100 and may support components and features of cutting apparatus 100. Each leg 160 may include one or more feet 165. Each foot 165 may comprise a non-skid material (e.g., a non-slip, high-friction material), such as for example, a rubber or other polymer material, etc. Further, each foot 165 optionally may include, or otherwise be coupled or connected to, an anchor 166. Each anchor 166 may allow for a fastener (e.g., screw, bolt, rivet, etc.) to be placed through anchor 166 to a surface on which apparatus 100 is mounted. For example, bolts may be placed through respective apertures of anchors 166 to secure feet 165 to a floor of a workshop, fixing cutting apparatus 100 in place, relative to the workshop.

Although the cutting apparatus 100 shown in FIGS. 1A-1B includes two legs 160 connected to the chassis 130, with each leg 160 including two feet 165 (e.g., at the front and back of cutting apparatus 100), and each foot 165 including or being connected to an anchor 166, this is merely exemplary. Cutting apparatus 100 may have any suitable number of legs 160, feet 165, and/or anchors 166, e.g., to allow user to fix or secure the position of cutting apparatus 100 during operation.

Figure 2A:
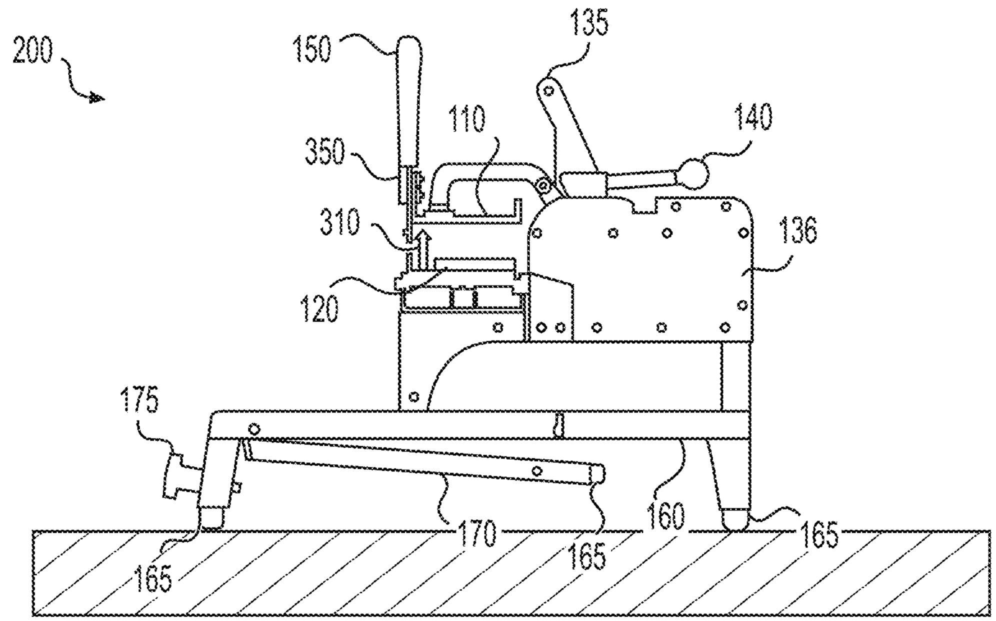
FIGS. 2A-2B are side views of an exemplary cutting apparatus including an anchor extension, in accordance with the present disclosure.
Figure 2B:
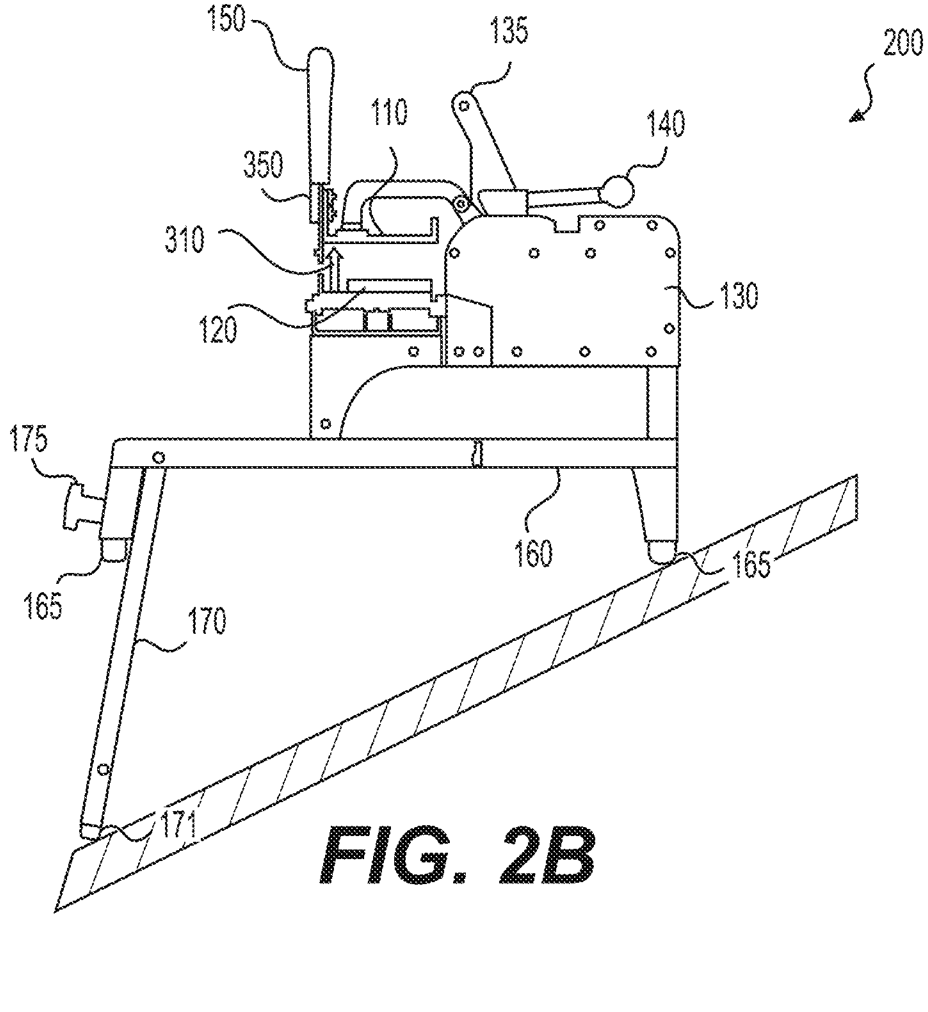

FIGS. 2A-2B illustrate a cutting apparatus 200 that may include any of the features of cutting apparatus 100, including top substrate interface 110 and bottom substrate interface 120. Referring to FIGS. 2A-2B, another exemplary cutting apparatus 200 is shown that includes one or more anchor extensions 170 to allow for securing cutting apparatus 200 in inclined positions and/or other non-horizontal positions. For example, anchor extension 170 may be used to secure cutting apparatus relative to a roof or other inclined or non-horizontal position. As shown in FIG. 2A, each anchor extension 170 may be coupled to, and movable relative to, a corresponding leg 160 of cutting apparatus 200 in order to support cutting apparatus 200 in one or more different positions. The length of each anchor extension 170 may be adjustable so that the cutting apparatus 200 can be configured for use on a variety of surfaces. For example, each anchor extension 170 may be deployed (e.g., extended, folded out, engaged, set-up), as shown in FIG. 2B, so as to contact a surface upon which cutting apparatus 200 rests. Cutting apparatus 200 may include one or more fasteners 175 that cooperate with each anchor extension 170 and corresponding leg to prevent further movement of anchor extension 170 relative to leg 160. When anchor extension 170 is deployed (see, e.g., FIG. 2B), the extension fastener 175 may be engaged with (e.g., threaded through and/or fastened to) anchor extension 170, thus securing anchor extension 170 in an inclined position.

Anchor extension 170 may include one or more feet 171, which may include any of the features of feet 165 of legs 160. In some embodiments, anchor extension 170 may be folded up (e.g., in a position wherein anchor extension 170 is not in use to support cutting apparatus 200) such that one or more feet 165 of legs 160 contact a floor or other supporting surface. For example, anchor extension 170 may be coupled to a leg 160 via a pivot point that allows anchor extension 170 to rotate relative to leg 160. In some aspects of the present disclosure, anchor extension 170 may be detachable from leg 160, e.g., to allow a user to selectively employ or remove anchor extension 170 as needed.

Figure 3A:
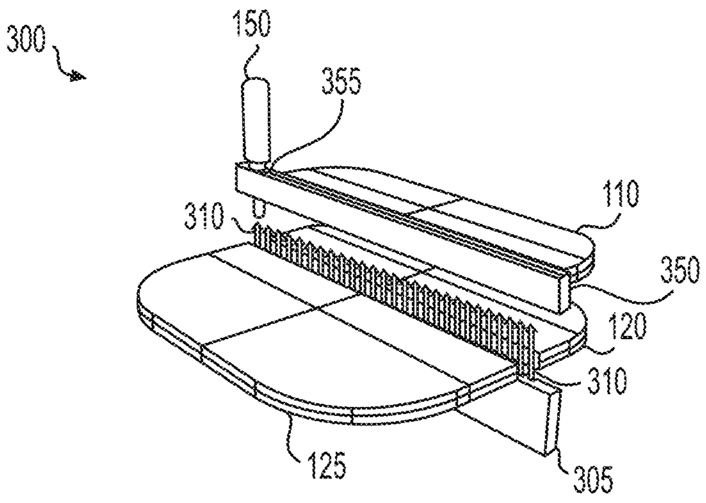
FIG. 3A is a perspective view of a scoring region of an exemplary cutting apparatus, in accordance with the present disclosure.
Figure 3B:
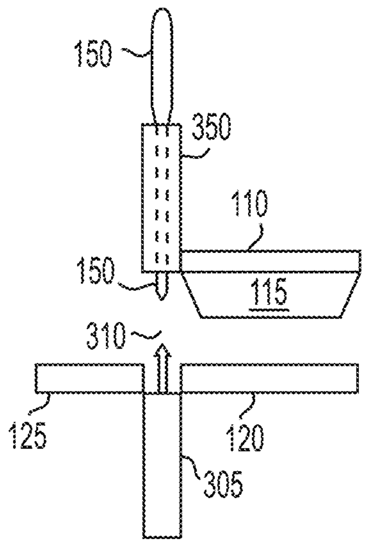
FIGS. 3B-3C are side views of a scoring region of an exemplary cutting apparatus, wherein FIG. 3C includes a substrate, in accordance with the present disclosure.
Figure 3C:
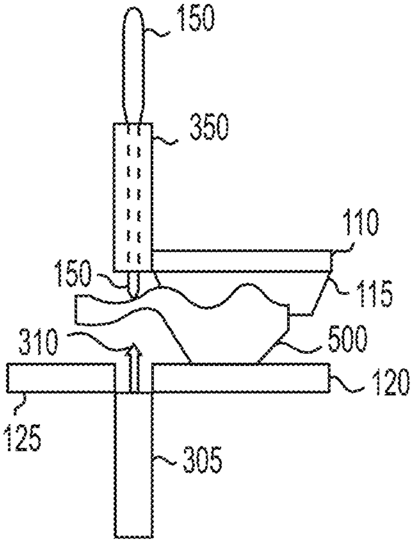

As those shown in FIGS. 1A-2B, cutting apparatus 100, 200 may be configured such that the slot 355 is proximate, e.g., in front of, the plurality of support pistons 310. For example, a vertical plane defined by slot 355 may be closer to the front of the apparatus 100, 200 than a vertical plane through the plurality of support pistons 310. FIGS. 3A-3C illustrate an example wherein slot 355 defines a vertical plane that includes the plurality of support pistons 310.

Further, for example, slot 355 may define a vertical plane closer to the back of the apparatus 100, 200 than a vertical plane that includes the plurality of support pistons 310.

FIGS. 3A-3C illustrate a cutting apparatus 300 that may include any of the features of cutting apparatus 100 and/or 200, including top substrate interface 110 and bottom substrate interface 120. As shown, cutting apparatus includes a scribe guide 350 that defines slot 355, is shown positioned in front of top substrate interface 110 and bottom substrate interface 120, above a substrate support 305. Scribe guide 350 may include a slot 355 across a width of scribe guide 350.

Referring to FIGS. 3A-3C, cutting apparatus 300 may include a front substrate support 125. Front substrate support 125 may be positioned below top substrate interface 110 (e.g., below and in front of top substrate interface 110), across a plurality of support pistons 310, and below and/or in front of scribe guide 350. The front substrate support 125 may provide additional support to hold a substrate in position (e.g., substrate 500 shown in FIG. 3C) relative to cutting apparatus 300 during cutting operations. Front substrate support 125 may be fixed to cutting apparatus 300, may be operable to pivot (e.g., pivot downward, pivot sidewise, and/or pivot away from scribe guide 350), or may be removable. For example, in the case of a removable or pivotable front substrate support 125, a locking mechanism may be selectively engaged to secure front substrate support 125 during use.

The one or more substrate interfaces (e.g., top substrate interface 110 and/or bottom substrate interface 120) of any of cutting apparatus 100, 200, 300 may include one or more additional features or components that aid in the securement of a substrate relative to the cutting apparatus 100, 200, 300. For example, FIGS. 3B-3C show a deformable support 115, such as a compressible and/or inflatable element. The deformable support 115 may comprise a material that can conform to a three-dimensional surface, profile, and/or contour of a substrate, such as, for example, sand, gel, rigid rubber, aerogel, beads, non-Newtonian fluid, or other elastomeric material. Some material of deformable support 115 may be disposed in an elastomeric coating (e.g., one or more elastic layers of rubber, plastic, polymer, or a composite material). In a neutral position, deformable support 115 may have an initial shape, such as for example, a rectangular or trapezoidal prism roughly the size and shape of the substrate interface it is connected to (e.g., top substrate interface 110 and/or bottom substrate interface 120). When deformable support 115 is biased against a substrate 500, deformable support 115 may deform and conform to the surface and shape of the substrate 500.

Deformable support 115 optionally may include an inflatable or otherwise expandable member that changes shape by introduction and removal of a fluid, such as liquid or gas, or introduction and removal of particles or other suitable solid. For example, deformable support may include a flexible balloon. In such cases, in an initial state, deformable support 115 may adopt a collapsed or folded balloon-like structure. When cutting apparatus 100, 200, 300 is in a closed configuration, fluid may be introduced into deformable support 115, such that portions of the deformable support 115 expand and conform to the surface and shape of the substrate (e.g., fill the gaps between substrate and one or more substrate interfaces of apparatus 100, 200, 300). The contact and/or pressure of deformable support 115 against the substrate may assist in predictably and reliably cutting a substrate while maintaining the integrity of the constituent pieces of the substrate.

Referring to FIGS. 3B-3C, one or more deformable supports 115 may be disposed between substrate interfaces (e.g., between top substrate interface 110 and bottom substrate interface 120) and brought into contact with substrate 500. When cutting apparatus 100, 200, 300 moves from an open configuration to a closed configuration (e.g., while top substrate interface 110 is moved closer to bottom substrate interface 120), the shape of deformable support 115 may conform to the surface of substrate 500 to adopt the shape (e.g., contours, profile, or curvature) of substrate 500. Deformable support 115 thus may secure substrate 500 in position relative to cutting apparatus 100, 200, 300 by applying pressure to substrate 500. Deformable support 115 may help to prevent cracking, splitting, and/or unintended breaking of substrate 500 during cutting operations.

A scoring region of each cutting apparatus 100, 200, 300 may include a substrate support 305, as mentioned above. Substrate support 305 may be configured to adjust to a profile or curvature of substrate 500, assist in securing substrate 500 in position relative to cutting apparatus 100, 200, 300, and/or otherwise assist cutting operations. Substrate support 305 may be coupled to the one or more support pistons 310, a housing, one or more piston channels, a locking mechanism, and/or a mechanism to adjust the height of the one or more support pistons 310. The substrate support 305 may be coupled or connected to, contained within, or affixed to chassis 130.

Cutting apparatus 100, 200, 300 may include any suitable number of support pistons 310. In some embodiments, cutting apparatus includes a plurality of support pistons 310, such as, e.g., at least 2, at least 5, or at least 10 support pistons 310. Further, for example, cutting apparatus may include 2 to 40 support pistons 310, such as 2 to 20, 2 to 16, 2 to 14, 2 to 8, 5 to 15, 10 to 40, 15 to 25, 6 to 40, 6 to 20, 25 to 35, or 10 to 20. Support pistons 310 may be positioned at regular or irregular intervals. In some embodiments, the distance between adjacent support pistons 310 is 0.5 in to 4 in, such as, for example, 1 in to 4 in, 1.5 in to 4 in, 1.5 in to 3 in, 1.5 in to 2.5 in, 1 in to 2 in, or 0.5 in to 2 in.

Each support piston 310 may have an elongated shape, extending from a bottom to a tapered top. The top of each support piston 310 may be tapered into an edge or a point. For example, the top of each support piston 310 may include a pointed shape, a trapezoidal shape, a beveled shape, a triangular shape, and/or a bodkin shape. Each support piston 310 may have an identical or similar size and/or shape, as compared to each other support piston 310. In some embodiments, one or more support pistons 310 may have a size and/or shape that is different than one or more other support pistons 310. In some embodiments, each support piston extends from a surface of contouring substrate support 305 (e.g., from a surface of a housing of contouring substrate support 305). The distance between the surface from which each support piston 310 extends and the top tip or edge of the support piston 310 may be referred to as a height of the support piston 310.

Figure 4:
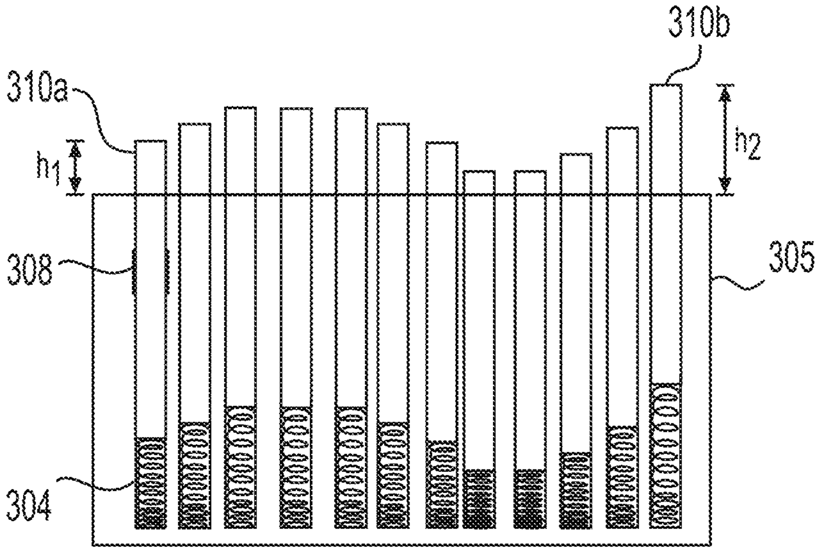
FIGS. 4, 5, 6A-6C, 7A-7B, and 8A-8B illustrate exemplary mechanisms for adjusting support pistons, in accordance with the present disclosure.

A height of one or more support pistons 310, of a plurality of support pistons 310, may be adjusted such that a line formed by the tips and/or edges of the top of each support piston 310 conforms to a profile or curvature of substrate 500. In some embodiments, each support piston 310 may be biased to extend to a maximum height. Referring to FIG. 4, substrate support 305 may include a plurality of support pistons 310 disposed in a plurality of piston channels 308. Each piston channel 308 may have a size and width (e.g., diameter in the case of a cylindrical channel) similar to the support piston 310 it houses and a height less than the maximum height of the support piston. As described above, each support piston 310 may have a height defined as the distance between the top of the support piston 310 and a top surface of a housing of substrate support 305. For example, referring to FIG. 4, support piston 310*a* has a height of $h_1$ and support piston 310*b* has a height of $h_2$. The respective height of each support piston may be controlled by different mechanisms.

For example, as illustrated in FIG. 4, each support piston 310 may be in communication with a spring 304. Each spring 304 may include a mechanical spring (e.g., metal spring) and/or fluid spring (e.g., air spring). The restoring force of each spring 304 may act on the support piston 310 it is connected to and thereby extend the top of the support piston (e.g., extend the top of the support piston past a top surface of a housing of a substrate support 305). The restoring force acting on the support pistons 310 may result in support pistons 310 being biased towards a maximum height. As a substrate 500 is placed into position, e.g., between top substrate interface 110 and bottom substrate interface 120, it may force one or more of the support pistons 310 to a lower height, towards piston channel 308, compressing the respective springs 304 in communication with the lowered support pistons 310.

Figure 5:
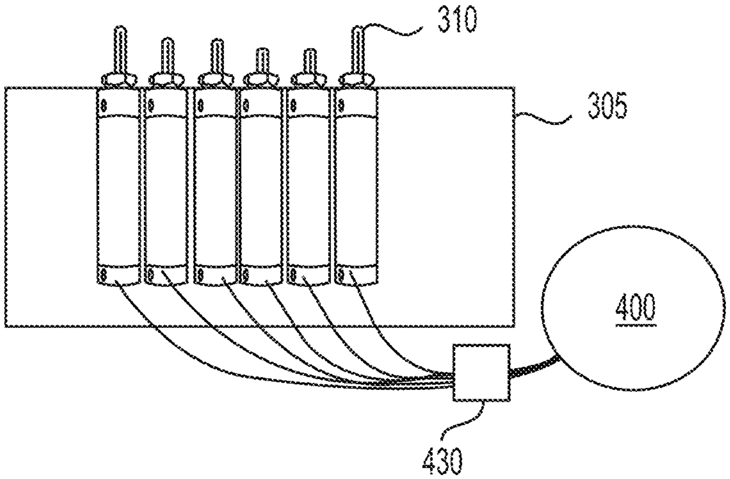

FIG. 5 illustrates another exemplary mechanism for adjusting height, wherein support pistons 310 are in communication with a source of compressed fluid, reservoir 400 (e.g., a compressed air reservoir and/or an air compressor) and a valve 430. The fluid from fluid reservoir 400 may be under pressure, transferring the pressure to support pistons 310, and biasing the support pistons to a maximum height. The valve 430 may be in an open position while substrate 500 is being positioned (e.g., while one or more support pistons 310 are being forced down/compressed), allowing fluid to flow back to fluid reservoir 400. Engaging a locking mechanism may cause valve 430 to close, blocking the flow of fluid between contouring substrate support 305 and fluid reservoir 400, thereby locking the positions of support pistons 310.

Still referring to FIG. 5, in some embodiments, support pistons 310 may be at a minimum height while in an initial, e.g., neutral, position. Fluid may flow from fluid reservoir 400 through valve 430, to substrate support 305, increasing the height of one or more support pistons 310. According to some aspects of the present disclosure, each support piston 310 may be individually actuated, e.g., via pressurized fluid. In some embodiments, a substrate 500 may be placed between a top substrate interface 110 and a bottom substrate interface 120, and each support piston 310, in a neutral position, is below substrate 500. See, e.g., FIG. 3C. Each support piston 310 may then be actuated (e.g., moved to an increased height via pressurized fluid and/or one or more other components described herein) to be in contact with, and/or applying force to, substrate 500. Once each support piston 310 contacts substrate 500, a user may close valve 430 in order to fix each support piston 310 into place (see, e.g., FIG. 5).

Substrate support 305 may include one or more sensors, processors, and/or controllers that direct the flow of pressurized fluid to actuate support pistons 310. Substrate support 305 may be able to actuate each support piston 310 to a pre-determined, pre-recorded, or custom configured profile. For example, after each support piston 310 is in contact with and/or applies pressure to substrate 500, the pressure applied to each support piston 310 (e.g., the height of each support piston 310) may be recorded and/or stored in a memory. In subsequent cutting operations, one or more processors of substrate support 305 may direct the delivery of pressurized fluid to actuate the height of each support piston 310 to the pre-recorded height.

Figure 6A:
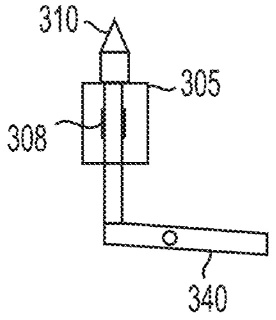
Figure 6B:
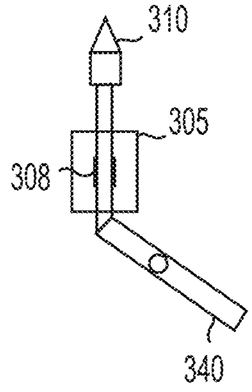
Figure 6C:
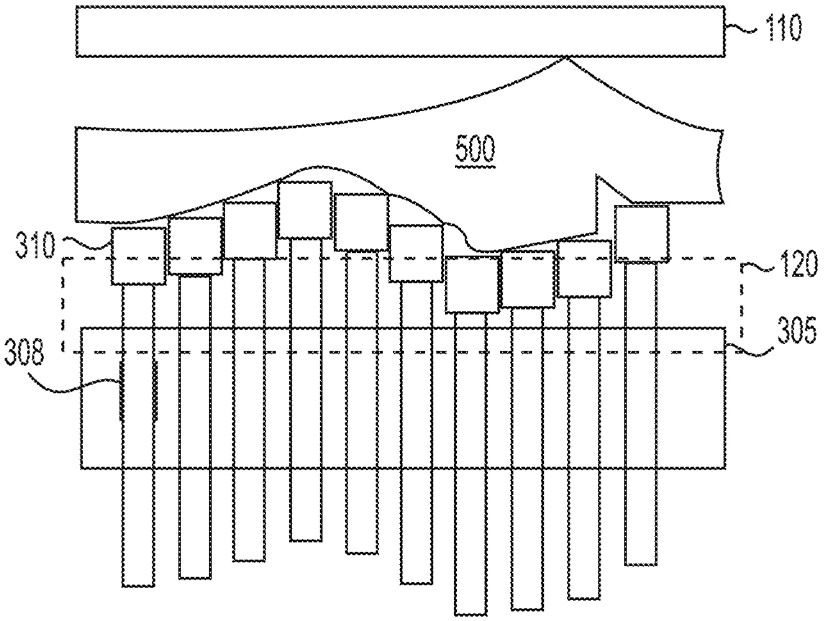

FIGS. 6A-6B illustrate another exemplary mechanism for controlling support pistons 310. As shown, substrate support 305 includes an actuation lever 340 in communication with an exemplary support piston 310 disposed in piston channel 308. Similar to compressed fluid actuation described above, each support piston 310 may be adjusted to a desired height via actuation lever 340. In some embodiments, each support piston 310 may be connected to an individual actuation lever 340 (e.g., wherein cutting apparatus 100, 200, 300 includes a plurality of actuation levers 340 corresponding to the plurality of support pistons 310). In other embodiments, a single actuation lever 340 may be in communication with multiple support pistons 310. Referring to FIG. 6C, for example, each support piston 340 may be actuated to a height such that it is in contact with, and applying force, to the bottom surface of substrate 500.

Figure 7A:
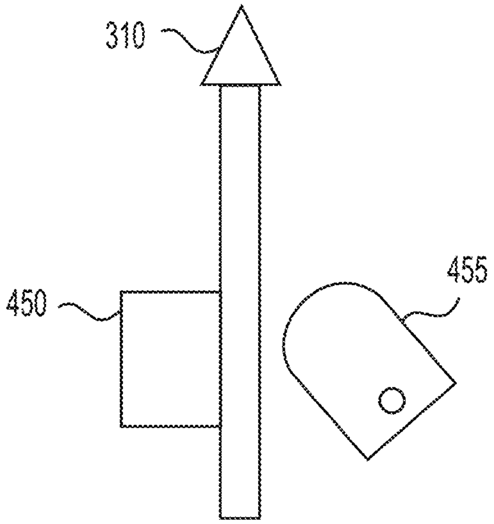
Figure 7B:
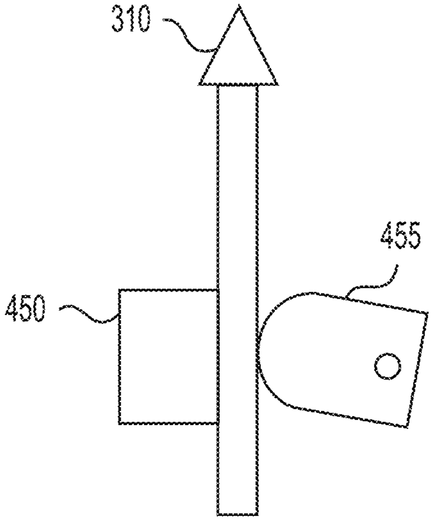

As mentioned above, cutting apparatuses herein, e.g., cutting apparatus 100, 200, 300, may include one or more locking mechanisms. An exemplary locking mechanism may include a cam-lock configuration for one or more support pistons 310. For example, referring to FIGS. 7A-7B, each support piston 310 may be proximate to a block 450 and a cam 455. In some embodiments, a single elongated block 450 and a single elongated cam 455 are proximate to multiple support pistons 310. When the cam-lock mechanism is not engaged, support piston 310 may freely move up and down relative to block 450 (e.g., FIG. 7A). When the mechanism is engaged, cam 455 may rotate to apply pressure to support piston 310, against block 450, securing the height of support piston 310. Further downforce on support piston 310 (e.g., from substrate 500 during cutting operations) may strengthen the locking-connection between cam 455, support piston 310, and block 450.

Figure 8A:
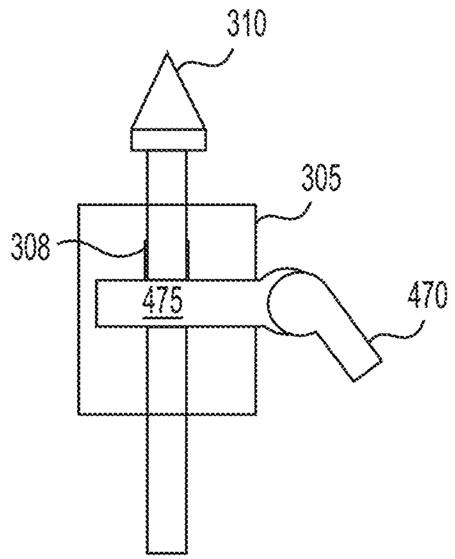
Figure 8B:
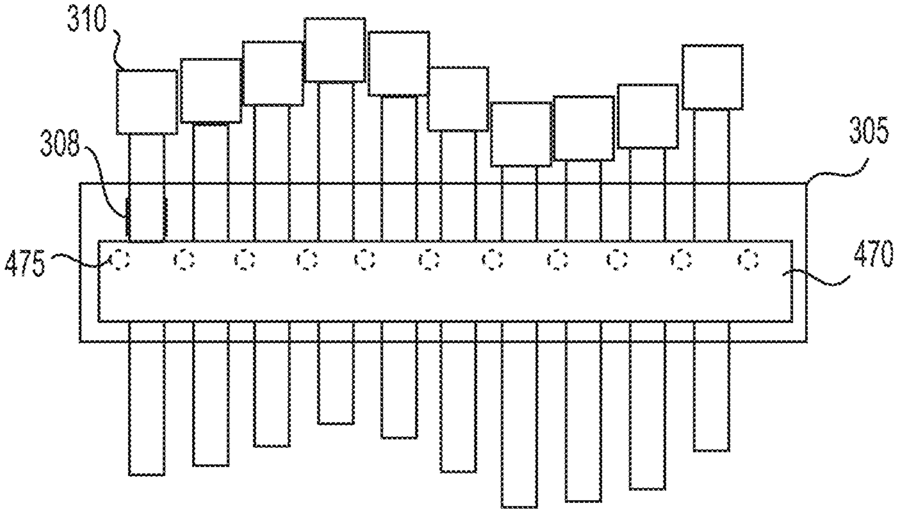

Referring to FIGS. 8A-8B, an exemplary locking mechanism may include one or more bars 475. While the locking mechanism is not engaged, each bar 475 may be retracted or not in contact with support piston 310 disposed in piston channel 308. When the locking mechanism is engaged, a lever 470 is actuated, driving each bar 475 towards support piston 310. When bar 475 is driven towards support piston 310 it may engage a slot, channel, groove, rivet, or other feature of the proximate support piston 310, securing the height of the support piston 310. As shown in FIG. 8B, a single lever 470, when actuated, may drive multiple bars 475 towards multiple support pistons 310.

One or more locking mechanisms may also include a screw lock. A lever or knob may be rotated (e.g., rotated relative to an axis that passes through the lever or knob and a width of the cutting apparatus 100) or otherwise engaged, to activate the screw lock. As the screw lock is activated one or more threaded rods may secure multiple support pistons 310 and/or one or more substrate interfaces relative to the chassis 130.

Figure 9A:
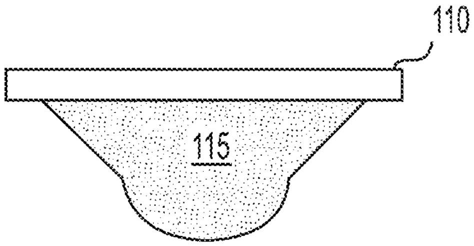
FIGS. 9A-9B are side views of a deformable support, in accordance with the present disclosure.
Figure 9B:
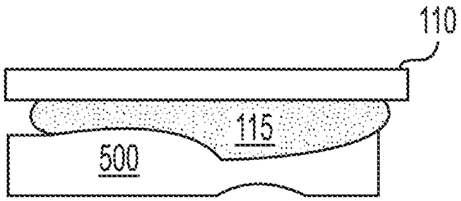

As described above and as shown in FIGS. 9A-9B, when deformable support 115 contacts a substrate 500, deformable support 115 may deform and conform to the shape of the substrate 500, such as, for example, a non-planar substrate 500. The effect of the deformable support 115 in assisting in predictably and reliably cutting substrate 500 may be improved by increasing in the contact area between deformable support 115 and substrate 500.

Figure 10A:
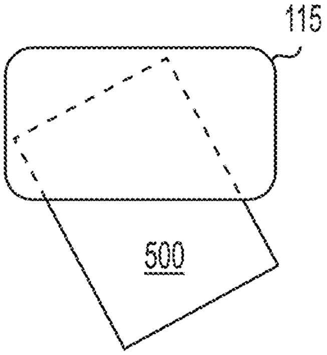
FIGS. 10A-10D show schematic views of deformable supports, in accordance with the present disclosure.

Deformable support 115 may include a flexible cover (e.g., one or more layers rubber, plastic, polymer, composite material, etc.), which may be elastic. For example, FIG. 10A illustrates a deformable support 115 disposed within an elastic cover.

Figure 10B:
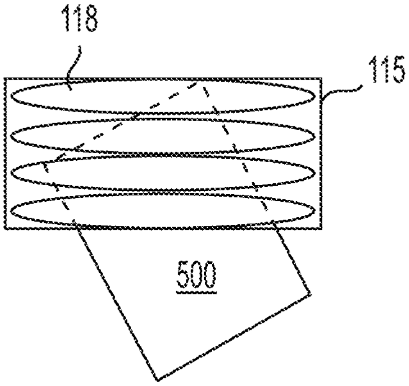
Figure 10C:
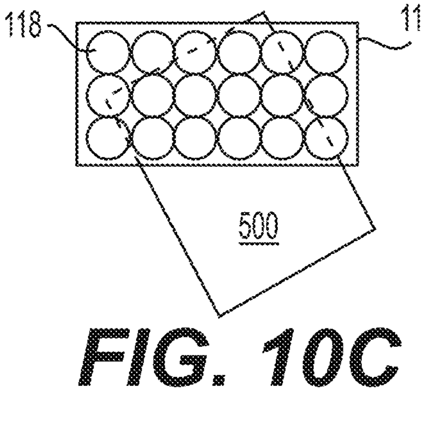
Figure 10D:
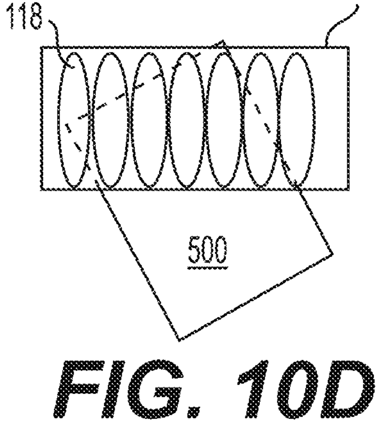

According to some aspects of the present disclosure, the cutting apparatuses herein may include a plurality of deformable supports 115, or a deformable support 115 that includes a plurality of deformable zones 118, each comprising a material (e.g., fluid or particles, among other materials) surrounded by an elastic cover. For example, several deformable supports 115 may be arranged proximate one another so as to contact different portions or areas of a substrate. In some examples, a deformable support 115 may include a plurality of deformable zones 118 arranged within a cover. Each deformable support 115 (or deformable zone 118 within a support 115) may have the same dimensions and/or materials as other deformable supports (or deformable zones 118 within a support 115), or one or more deformable supports 115 (or deformable zones 118 within a support 115) may have a different dimension (size, shape, etc.) and/or include different materials than one or more other deformable supports (or deformable zones 118 within a support 115). For example, the compressibility of one deformable support 115 or zone 118 of a support 115 may be tailored (via, e.g., material composition) to be greater or less than another deformable support 115 or zone 118 of a support 115, depending on the size, composition, and/or shape of substrate 500. Deformable supports 115 and zones 118 may be elongated and arranged in rows (see, e.g., FIG. 10B), elongated and arranged in columns (see, e.g., FIG. 10D), and/or rounded (circular, elliptical, ovular, etc.) and arranged in an array (see, e.g., FIG. 10C). The skilled artisan will recognize other arrangements and variations are possible and encompassed herein.

Cutting apparatuses according to the present disclosure may include any combination of components from one or more embodiments discussed herein. Cutting apparatus 100, 200, 300 may be used in cutting operations (e.g., processes related to dividing a substrate 500 into multiple pieces). Various exemplary methods of using cutting apparatus 100, 200, 300 are discussed below. The steps and processes of any one method may be used in combination and order with steps and processes of any other method.

In some embodiments, a substrate 500 may be placed between a top substrate support 110 and a bottom substrate support 120 of a cutting apparatus 100, 200, 300 in an open configuration. The substrate 500 may comprise inorganic and/or organic materials. For example, the substrate 500 may comprise cement, concrete, ceramic, or another material, such as, for example, non-homogenous materials (e.g., materials including aggregate), crystalline materials, semi-crystalline materials, glassy materials, or composite materials. The substrate 500 may be non-planar, curved, and/or include a three-dimensional profile (e.g., one section of the substrate 500 has a different thickness than other sections of substrate 500), e.g., wherein the substrate 500 is capable of being snapped and/or fractured. For example, the substrate may comprise materials and have a thickness that provide the ability for the substrate to fracture along a score line. In some embodiments, substrate 500 may have a thickness of 0.1 in to 2.0 in, such as, for example, 0.1 in to 1.5 in, 0.2 in to 2.0 in, 0.2 in to 1.5 in, 0.1 in to 1.0 in, 0.1 in to 0.6 in, or 0.2 in to 0.4 in. As described above, substrate 500 may be non-planar and a thickest region of substrate 500 may be, for example, 0.1 in to 1.0 in thicker, 0.1 to 0.6 in thicker, 0.2 in to 0.5 in thicker, or 0.1 in to 0.4 in thicker than a thinnest region of substrate 500.

Cutting apparatus 100, 200, 300 may then be adjusted to a closed configuration such that a substrate interface (e.g., top substrate interface 110 and/or bottom substrate interface 120) support the substrate 500 (e.g., non-planar substrate 500). After cutting apparatus 100, 200, 300 is in a closed configuration, the height of one or more support pistons 310 may be adjusted such that a line formed by the top edges and/or points of the support pistons 310 conforms to a curve, profile, and/or shape of substrate 500. One or more locking mechanisms may be engaged to secure the position of the support pistons 310 relative to the substrate 500.

A scribe 150 may be moved within a slot 355, to form a score line on the surface of substrate 500 via the tip of scribe 150. The score line may be parallel or transverse to a line formed by the tops of support pistons 310. Alternatively or in addition, the score line may be in front of, behind, and/or above a line formed by the tops of support pistons 310.

After a score line is formed on substrate 500, substrate 500 may be cut. Cutting substrate 500 may include striking or otherwise applying force to substrate 500 on one or both sides of the score line. After substrate 500 is cut, one or more locking mechanisms may be disengaged so as to release substrate 500 from cutting apparatus. After the locking mechanism(s) are disengaged, optionally, support pistons 310 may be reset to an initial, neutral, position. Cutting apparatus may be reverted to an open configuration so that one or more pieces of the cut substrate 500 that are positioned between top substrate interface 110 and bottom substrate interface 120 may be removed.

What is claimed is:

1. A method for cutting a substrate, the method comprising:

retaining the substrate between two substrate interfaces of a cutting apparatus, wherein:

(a) the substrate is non-planar;

(b) the substrate comprises concrete; or (c) the substrate is non-planar and comprises concrete;

making a score line on a top surface of the substrate by sliding a scribe across the top surface and within a slot of the cutting apparatus while the substrate is retained between the two substrate interfaces; and separating the substrate into at least two pieces.

2. The method of claim 1, further comprising engaging a locking mechanism prior to making the score line.

3. The method of claim 1, wherein the substrate is separated into two pieces defined by the score line.

4. The method of claim 1, wherein the substrate is non-planar and the cutting apparatus comprises a plurality of support pistons, and wherein the method comprises changing the height of one support piston relative to the height of an adjacent support piston before making the score line such that each support piston of the plurality of support pistons contacts the substrate.

5. The method of claim 4, wherein changing the height of the one support piston relative to the height of the adjacent support piston includes actuating a lever of the cutting apparatus.

6. The method of claim 4, further comprising closing a valve of the cutting apparatus to fix a position of each support piston of the plurality of support pistons into place once each support piston contacts the substrate.

7. The method of claim 4, further comprising repositioning each support piston after separating the substrate into the at least two pieces.

8. The method of claim 1, wherein separating the substrate into the at least two pieces includes applying force to the substrate on one or both sides of the score line.

9. The method of claim 1, further comprising disengaging a locking mechanism of the cutting apparatus after separating the substrate into the at least two pieces.

10. A method for cutting a substrate, the method comprising:

contacting the substrate between a top substrate interface and a bottom substrate interface;

contacting the substrate with a plurality of support pistons of a cutting apparatus, wherein the substrate is non-planar and the plurality of support pistons contact a non-planar bottom surface of the substrate;

making a score line on a top surface of the substrate with a scribe of the cutting apparatus; and separating the substrate into at least two pieces.

11. The method of claim 10, further comprising inserting the scribe into a scribe guide of the cutting apparatus prior to making the score line.

12. The method of claim 10, wherein making the score line includes moving the scribe transversely across a surface of the substrate by moving the scribe along a slot of the cutting apparatus.

13. The method of claim 10, further comprising activating a lever of the cutting apparatus to engage one or more locking mechanisms after contacting the substrate with the top substrate interface and the bottom substrate interface in order to retain the substrate.

14. The method of claim 10, further comprising moving one or more support pistons of the plurality of support pistons relative to the bottom substrate interface.

15. The method of claim 10, wherein contacting the substrate with the plurality of support pistons includes applying pressure to the substrate.

16. The method of claim 10, wherein the score line is parallel to a line formed by top portions of the plurality of support pistons.

17. The method of claim 10, wherein the score line is transverse to a line formed by top portions of the plurality of support pistons.

18. The method of claim 10, further comprising changing a height of one or more support pistons of the plurality of support pistons before making the score line such that each support piston of the plurality of support pistons conforms to the non-planar bottom surface of the substrate.

19. The method of claim 18, wherein changing the height of the one or more support pistons includes changing the height of one support piston relative to the height of an adjacent support piston.

* * * * *